United States Patent [19]
Whitford

[11] Patent Number: 5,137,286
[45] Date of Patent: Aug. 11, 1992

[54] PERMANENT MAGNET FLOATING SHAFT SEAL

[75] Inventor: Robert P. Whitford, Fitchburg, Mass.

[73] Assignee: General Electric Company, Schenectady, N.Y.

[21] Appl. No.: 749,326

[22] Filed: Aug. 23, 1991

[51] Int. Cl.⁵ .............................................. F16J 15/44
[52] U.S. Cl. ........................................ 277/80; 277/53; 277/173; 277/174
[58] Field of Search ................... 277/53, 80, 173, 174

[56] References Cited

U.S. PATENT DOCUMENTS

| | | |
|---|---|---|
| 3,184,244 | 5/1965 | Van Vleet . |
| 3,460,844 | 8/1969 | Whittle . |
| 3,499,653 | 3/1970 | Gardner . |
| 3,708,177 | 1/1973 | Baermann ............................ 277/80 |
| 3,749,411 | 7/1973 | Lennon . |
| 4,429,883 | 2/1984 | Nakanishi ............................ 277/53 |
| 4,434,987 | 3/1984 | Albers et al. ........................ 277/80 |
| 4,447,063 | 5/1984 | Kotzur et al. ....................... 277/80 |
| 4,455,026 | 6/1984 | Pinkus et al. . |
| 4,575,103 | 3/1986 | Pedu .................................... 277/80 |
| 4,643,437 | 2/1987 | Salant . |
| 4,669,735 | 6/1987 | Sundberg . |
| 4,671,679 | 6/1987 | Heshmat . |
| 4,722,534 | 2/1988 | Wentworth . |
| 4,998,739 | 3/1991 | Weiler ................................. 277/53 |
| 5,046,718 | 9/1991 | Hay .................................. 277/53 X |

FOREIGN PATENT DOCUMENTS

| | | | |
|---|---|---|---|
| 1052192 | 3/1959 | Fed. Rep. of Germany ........ 277/80 |
| 201179 | 7/1983 | Fed. Rep. of Germany ........ 277/80 |
| 30420 | 2/1983 | Japan .................................... 277/173 |
| 504035 | 3/1976 | U.S.S.R. ............................... 277/80 |
| 2076907 | 12/1981 | United Kingdom ................. 277/173 |

OTHER PUBLICATIONS

*Power Engineering*/Jan. 1990, "Magnetic Bearings can Increase Availability, Reduce O&M Costs," Gray et al.

Primary Examiner—William A. Cuchlinski, Jr.
Assistant Examiner—Scott W. Cummings
Attorney, Agent, or Firm—Nixon & Vanderhye

[57] ABSTRACT

A seal ring is spaced radially about a rotating shaft and axially from opposed walls of a housing by permanent directional magnets mounted in the seal ring, shaft and housing. Permanent magnets are disposed about the interior surface of the seal ring and the exterior surface of the shaft, respectively, such that opposite poles lie in radial opposition affording a repelling force therebetween maintaining a radial gap therebetween constant. Permanent directional magnets are disposed on each side of the gaps between the seal ring and opposing axial faces of the housing and have like poles in opposition to one another to locate the seal ring in the axial direction. The gaps between the housing and seal ring and between the seal ring and shaft are maintained by the magnets at minimum clearance, thereby affording a non-contacting seal with well defined leakage paths.

14 Claims, 1 Drawing Sheet

PERMANENT MAGNET FLOATING SHAFT SEAL

BACKGROUND AND SUMMARY OF THE INVENTION

The present invention relates to a non-contacting seal for minimizing leakage between fixed and rotatable elements and particularly relates to a two-directional permanent magnetic seal system that floats, i.e., levitates, a seal ring about a rotating shaft with small radial clearance between the shaft and seal ring and small axial clearances between opposite faces of the seal ring and a housing whereby fluid leakage through the seal may be controlled.

Many and various types of sealing systems have been used for controlling leakage in rotating equipment, such as steam turbines. Labyrinth seals, for example, used in steam turbines are non-contacting and, therefore, have long life. Their relatively high leakage rates, however, require an auxiliary gland seal system. Such gland seal systems include highly complex and heavy seal regulators for reducing high pressure steam to the few pounds per square inch required for gland sealing. Several manual valves, high and low pressure drains, and several lengths of steam piping constitute additional complexities for such systems. Moreover, gland exhaust systems also require air ejectors, a gland exhaust condenser and piping to carry the steam and air away from the system. Additionally, weight and space requirements for these systems are high and hence costly, for example, where steam turbines are used in a ship's engine room.

Carbon ring seals are contacting seals that also minimize leakage, e.g., steam leakage. Carbon ring seals, however, have relatively high wear rates.

Rotary gap type seals are also known, such as shown in U.S. Pat. No. 3,499,653. In that patent, gas seals are disclosed which are non-contacting at high speed and control leakage by using hydrodynamic forces to control separation between sealing faces. At low speeds and/or pressures, however, some contact usually occurs resulting in wear and possible damage.

From U.S. Pat. Nos. 4,434,987 and 4,447,063, it is known to use an electromagnet to control a gap between a rotating ring and a surrounding non-rotating ring in shaft seals where sealing fluid is pumped into the gap and exhausted through a bore in the stator elements. These are positive systems employing multiple parts and hence are costly and complex.

The permanent magnet floating shaft seal of the present invention is designed to overcome the limitations of the conventional sealing systems discussed above, i.e., to minimize fluid leakage, maximize life and wear, reduce weight, complexity, volume and costs. According to the present invention, an annular radially extending gap between a floating seal ring and a rotating shaft, as well as axially extending gaps between the seal ring and shaft housing, are magnetically and therefore passively controlled by directional permanent magnets to maintain those gaps substantially constant with minimum clearance, hence controlling fluid leakage. The seal ring levitates axially and radially to compensate for thermal expansion, vibrations and the like that tend to open or close the gaps between the sealing faces. Because of the non-contacting nature of the seal ring, vis-a-vis, the housing and rotating shaft, the various sealing parts do not wear. Further, the seal ring is free to move radially to follow radial and other vibratory shaft excursions, as well as permit relative axial movement between the seal ring and shaft.

To accomplish the foregoing, the permanent magnetic floating shaft seal of the present invention includes three distinct parts, each having a permanent magnet cooperable with a permanent magnet of at least one adjoining part. The three parts include a seal ring having two separate and distinct directional permanent magnets, a housing having a directional permanent magnet, and a shaft having a directional permanent magnet. More particularly, the shaft has a first annular permanent magnet extending annularly about its outer surface. The seal ring includes a second annular magnet in spaced radial opposition to the first permanent magnet of the shaft. The poles of the permanent magnets are arranged such that magnetic lines of force serve to repel the shaft and seal ring away from one another whereby the seal ring levitates in a spaced radial direction relative to the shaft with the radial gap therebetween being maintained substantially constant. The seal ring includes third and fourth annular directional permanent magnets disposed along the respective opposite axial faces thereof. Fifth and sixth annular directional permanent magnets are disposed in axial opposition to the third and fourth permanent magnets of the seal ring, respectively, such that the opposing magnets, i.e., the third and fifth permanent magnets and the fourth and sixth permanent magnets, provide respective axially extending lines of force which repel one another. Accordingly, the seal ring is not only levitated in a radial direction but axially between the permanent magnets of the housing. The seal ring, therefore, lies out of contact with the housing and shaft with the gaps formed between the seal ring and shaft and the seal and ring housing, providing extremely small clearances affording minimum leakage. Thus, the seal ring is free to move radially to follow radial excursions of the shaft. The shaft is also free to move axially relative to the seal ring. The shaft is free to move axially because the axial movement is at right angles to the levitation forces (flux lines). The resisting forces at right angles to the flux lines are small in comparison to the directional magnetic levitation forces.

To ensure levitation of the seal ring in a radial direction, notwithstanding axial movement of the shaft relative to the seal ring, the radially opposed directional permanent magnets of the seal ring and shaft have different axial lengths. Thus, when the shaft has the axially wider magnet, for example, the movement of the shaft relative to the seal ring in the axial direction causes no change in the magnetic forces exerted between the two parts affording levitation of the seal ring in the radial direction. Conversely, the magnet on the seal ring may be wider than the opposing magnet on the shaft without adverse effect on the magnitude of the magnetic forces therebetween.

In a preferred embodiment according to the present invention, there is provided a seal for minimizing leakage between fixed and rotatable elements comprising a shaft mounted for rotation about an axis, the shaft having a first permanent magnet about the shaft, a housing disposed about and spaced from the shaft, a seal ring in the housing about the shaft, the seal ring being spaced from the shaft and defining a circumferentially extending radial gap therewith, the seal ring carrying a second permanent magnet at a like axial position about the shaft as the first permanent magnet and in radially spaced opposition thereto, with means for maintaining the seal ring spaced from the housing with a minimum clearance between the housing and the seal ring, the first and second permanent magnets generating repelling forces therebetween to enable the seal ring to maintain a substantially constant annular gap between the seal ring and the shaft at each circumferential position thereabout to minimize leakage between the seal ring and shaft.

In a further preferred embodiment according to the present invention, there is provided a seal for minimizing leakage between fixed and rotatable elements comprising a shaft mounted for rotation about an axis, a housing disposed about and spaced from the shaft, a seal ring in the housing about the shaft, the seal ring being spaced from the shaft and defining a circumferentially extending radial gap therebetween, a pair of annular permanent magnets carried by the shaft and the seal ring at like axial positions and in radially spaced opposition to one another, a second pair of permanent magnets carried by the seal ring and the housing, respectively, in axial opposition to one another on one side of the seal ring to define an axially extending gap between the seal ring and the housing, and a third pair of permanent magnets carried by the seal ring and the housing, respectively, in axial opposition to one another on the opposite side of the seal ring to define a second axially extending gap between the seal ring and the housing, the pairs of permanent magnets generating repelling forces therebetween to enable the seal ring to maintain substantially constant gaps between it and the shaft and housing to minimize leakage past the seal.

Accordingly, it is a principal object of the present invention to provide a novel and improved seal between fixed and rotatable elements which minimizes fluid leakage therebetween, maximizes the life of the parts of the seal and reduces the weight, volume and cost of the seal.

These and further objects and advantages of the present invention will become more apparent upon reference to the following specification, appended claims and drawings.

BRIEF DESCRIPTION OF THE DRAWING FIGURES

FIG. 1 is a fragmentary cross-sectional view illustrating a permanent magnet floating shaft seal constructed in accordance with the present invention and taken along a radius of the seal; and FIG. 2 is a view similar to FIG. 1 illustrating a further embodiment of the shaft seal hereof.

DETAILED DESCRIPTION OF THE DRAWING FIGURES

Reference will now be made in detail to a present preferred embodiment of the invention, an example of which is illustrated in the accompanying drawings.

Figure 1:
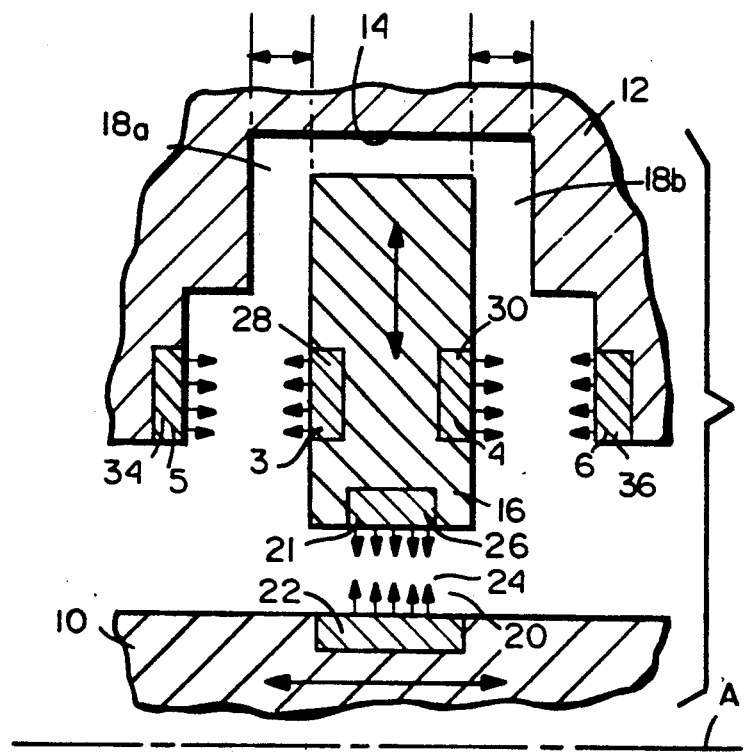

Referring now to the drawings, particularly to FIG. 1, there is illustrated a shaft 10 rotatable about an axis A and a housing 12 surrounding the shaft and having an annular cavity 14. Within cavity 14 and spaced from axially opposite walls thereof is an annular seal ring 16. Thus, axially extending gaps 18a and 18b are disposed between seal ring 16 and the axially opposed walls of housing 12. As illustrated, annular seal ring 16 is also radially spaced from the cylindrical outer surface of shaft 10. A radially extending gap 20 is thus defined between the interior surface of seal ring 16 and the outer surface of shaft 10. These gaps are of nominal clearance and may be on the order of 0.001 inch. Consequently, there is a leakage path through the seal through the radial and axial gaps.

In order to maintain those gaps and minimize the leakage past the seal, seal ring 16 floats or levitates in the illustrated position without contact with either the housing or the shaft by means of a series of directional permanent magnets carried by the shaft, seal ring and housing. Particularly, a first directional permanent magnet 22 is disposed about shaft 10 and exposed through the outer surface of shaft 10. The lines of flux of the permanent magnet are illustrated by the arrows 24, the different pole faces being on the radially interior and exterior surfaces of the annular permanent magnet 22. Disposed along the interior surface of seal ring 16 is a second directional permanent magnet 26 having radially interior and exterior pole faces and arranged such that like pole faces of magnets 22 and 26 are in radial opposition one to the other. Consequently, the lines of flux are arranged to afford repelling forces between the two magnets 22 and 26 whereby a radial gap 20 is maintained between seal ring 16 and shaft 10. It will appreciated that, in this configuration, the magnets 22 and 26 accommodate any radial excursions of the shaft by radial displacement of seal ring 16 with the shaft such that the gap 20 is maintained.

To maintain seal ring 16 in proper axial location relative to shaft 10 and permanent magnet 22 carried thereby, seal ring 16 carries annular directional, third and fourth, permanent magnets 28 and 30 exposed through its axially opposite end faces. The poles are arranged such that the lines of flux extend in opposite axial directions. Cooperable with the third and fourth magnets 28 and 30, respectively, are fifth and sixth directional permanent magnets 34 and 36, respectively, mounted in housing 12. The permanent magnets 34 and 36 are annular and have pole faces facing in the axial direction. Magnets 34 and 36 lie in axial opposition to magnets 28 and 30, respectively, whereby like pole faces lie in axial opposition one to the other to provide a repelling force between the magnet pairs 28, 34 and 30, 36, respectively. Consequently, the magnetic repulsion forces of these paired magnets maintain seal ring 16 spaced between the opposite faces of the housing and hence maintain the gaps 18a and 18b between the housing faces and the end faces of seal ring 16.

It will thus be appreciated that seal ring 16 floats or levitates within cavity 14 in both axial and radial directions. Seal ring 16 is, therefore, maintained out of contact with the shaft 10 and housing 12, the gaps 18a, 18b and 20 being maintained by the permanent magnets at all times. A clearance is afforded between the outer surface of seal ring 16 in the housing to permit radial excursions of the shaft with consequent radial movement of seal ring 16. The size of that clearance, however, is of no moment because it is bounded on opposite sides by the gaps 18a and 18b, the sizes of which are maintained substantially constant by the magnetic repulsion forces of the paired axially facing magnets.

Because the shaft may have slight axial displacement relative to the housing, it is necessary to maintain the gap 20 between seal ring 16 and shaft 10 constant during any such axial movement. To that end, the first and second permanent magnets 22 and 26, respectively, have different widths in the axial direction. Preferably, the first magnet 22 mounted on shaft 10 has a greater axial width than the axial width of magnet 26. Thus, in the event the shaft 10 together with its first permanent 22 is axially displaced, it will be appreciated that one end of magnet 22 may move axially away from magnet 26 while the opposite end of magnet 22 moves into radial opposition to magnet 26. In this manner, substantially constant repelling forces are maintained between magnets 22 and 26 notwithstanding relative axial movement between shaft 10 and seal ring 16. The seal ring 16 is free to move radially to follow shaft excursions since the resisting forces at right angles to the magnetic forces from directional magnets 22, 28 and 30, 36 are small.

Figure 2:
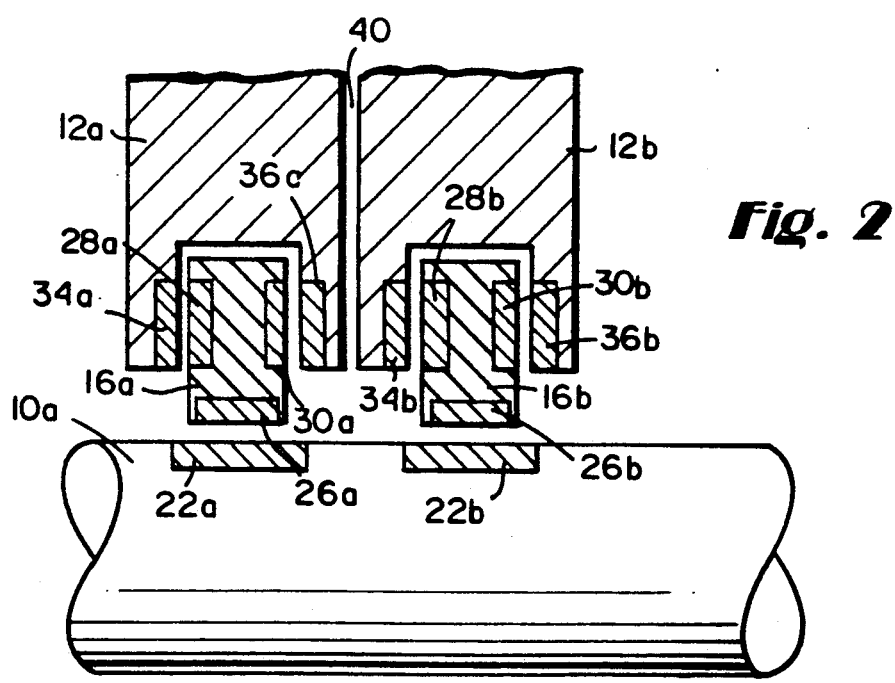

Referring now to the embodiment hereof illustrated in FIG. 2, there is provided a pair of seals axially juxtaposed one to the other with a leakage path 40 therebetween. In this embodiment, the first seal will be described using like reference numerals as in the first embodiment followed by the suffix "a", while the second seal will be described using like reference numerals as in the first embodiment followed by the suffix "b". Thus, seal ring 16a is mounted between the housing 12a and shaft 10a. Shaft 10a carries the annular first permanent magnet 22a, while seal ring 16a carries second, third and fourth directional permanent magnets 26a, 28a and 30a arranged similarly as in the previous embodiment. Likewise, housing 12a carries permanent magnets 34a and 36a in axial opposition to magnets 28a and 30a, respectively. The operation of this portion of the seal is similar as previously described with respect to the embodiment of FIG. 1.

The second seal is substantially identical to the first seal. Thus, shaft 10a carries a seventh directional permanent magnet 22b, and seal ring 16b carries eighth, ninth and tenth permanent magnets 26b, 28b and 30b arranged similarly as magnets 26, 28 and 30, respectively. Housing 12b carries eleventh and twelfth permanent magnets 34b and 36b similar to magnets 34 and 36, respectively. The identification of the magnets as first through twelfth is used to distinguish the magnets one from the other and does not necessarily infer the number of magnets in a seal system constructed in accordance with the present invention.

The magnets in the embodiment of FIG. 2 operate similarly as previously described with respect to the embodiment of FIG. 1. The housings 12a and 12b, of course, may be integral and leakage paths 40 may comprise discrete paths circumferentially spaced about the housings in communication with the area between the seal rings 16a and 16b. Consequently, ambient air on one side of the seal and steam on the other side may leak past the respective seals and be withdrawn through the leakage paths 40. Importantly, the magnets serve to maintain the radial gaps between seal rings 16a and 16b and the rotor 10, as well as the axial gaps between each seal ring and its corresponding housing 12a and 12b.

From the foregoing description, it will be appreciated that the objectives of the present invention are fully accomplished. The seal system disclosed eliminates weight and space requirements of prior seals, for example, by eliminating gland seal and auxiliary condenser systems. The present seal also insures long life and low maintenance of the various seal parts because of their non-contacting nature. It is also a passive seal system and does not require controls for maintaining the seal gaps.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A seal for minimizing leakage between fixed and rotatable elements comprising:
   a shaft mounted for rotation about an axis, said shaft having a first permanent magnet about said shaft;
   a housing disposed about and spaced from said shaft;
   a seal ring in said housing about said shaft, said seal ring being spaced from said shaft and defining a circumferentially extending radial gap therewith;
   said seal ring carrying a second permanent magnet at a like axial position about said shaft as said first permanent magnet and in radially spaced opposition thereto;
   means for maintaining said seal ring spaced from said housing with a minimum clearance between said housing and said seal ring;
   said first and second permanent magnets generating repelling forces therebetween to enable said seal ring to maintain a substantially constant annular gap between said seal ring and said shaft at each circumferential position thereabout to minimize leakage between the seal ring and shaft.

2. A seal according to claim 1 wherein said first permanent magnet carried by said shaft extends annularly about the outer surface of said shaft, said second permanent magnet extending annularly about said seal ring, said first and second permanent magnets having axial widths different from one another enabling relative axial displacement of said shaft and said seal ring without substantially affecting the magnitude of the forces generated by said first and second permanent magnets maintaining said gap substantially constant.

3. A seal according to claim 2 wherein said maintaining means includes a further permanent magnet carried by said seal ring and facing in one axial direction, a permanent magnet carried by said housing facing in the opposite axial direction and in axial opposition to said further magnet carried by said seal ring to define an axially extending gap therebetween whereby said axially opposed permanent magnets maintain said axially extending gap therebetween substantially constant.

4. A seal according to claim 3 wherein said first magnet on said shaft has an axial extent greater than the axial extent of said second magnet on said seal ring.

5. A seal according to claim 1 wherein said maintaining means includes a further permanent magnet carried by said seal ring and facing in one axial direction, a permanent magnet carried by said housing facing in the opposite axial direction and in axial opposition to said further magnet carried by said seal ring to define an axially extending gap therebetween whereby said axially opposed permanent magnets maintain said axially extending gap therebetween substantially constant.

6. A seal according to claim 1 including third and fourth permanent magnets carried by said seal ring on opposite axial sides thereof, fifth and sixth permanent magnets carried by said housing on opposite sides of said seal ring, respectively, said third and fifth permanent magnets being in axial opposition to one another to define an axially extending gap therebetween on one side of said seal ring, said fourth and sixth permanent magnets being in axial opposition to one another to define an axially extending gap therebetween on the opposite side of said seal ring whereby said axially opposite permanent magnets cooperate with one another to maintain said axially extending gaps between said seal ring and said housing substantially constant.

7. A seal according to claim 6 wherein said first permanent magnet carried by said shaft extends annularly about the outer surface of said shaft, said second permanent magnet extending annularly about said seal ring, said first and second permanent magnets having axial widths different from one another enabling relative axial displacement of said shaft and said seal ring without substantially affecting the magnitude of the forces generated by said first and second permanent magnets maintaining said gap substantially constant.

8. A seal according to claim 1 wherein a second seal ring is disposed in said housing about said shaft and spaced axially from the first-mentioned seal ring, said second seal ring being spaced from said shaft and defining a circumferentially extending radial gap therewith;
  said shaft carrying a seventh permanent magnet about said shaft at an axial location spaced from said first permanent magnet;
  said second seal ring carrying an eighth permanent magnet at a like axial position about said shaft as said seventh permanent magnet and in radially spaced opposition thereto;
  means for maintaining said second seal ring spaced from said housing with a minimum clearance between said housing and said seal ring;
  said seventh and eighth permanent magnets generating repelling forces therebetween to enable said second seal ring to maintain a substantially constant radial gap between said second seal ring and said shaft at each circumferential position thereabout to minimize leakage between the second seal ring and shaft.

9. A seal according to claim 8 wherein said seventh permanent magnet carried by said shaft extends annularly about the outer surface of said shaft, said eighth permanent magnet extending annularly about said second seal ring, said seventh and eighth permanent magnets having axial widths different from one another enabling relative axial displacement of said shaft and said second seal ring without substantially affecting the magnitude of the forces generated by said seventh and eighth permanent magnets maintaining said gap between said second seal ring and said housing substantially constant.

10. A seal according to claim 9 including a further permanent magnet carried by each of said first and said second seal rings and facing axially, a pair of permanent magnets carried by said housing in respective axial opposition to said further magnets carried by said first and second seal rings to define axially extending gaps therebetween whereby said axially opposed magnets cooperate with one another to maintain the respective gaps between said seal rings and said housing substantially constant.

11. A seal according to claim 10 wherein said permanent magnets on said shaft have axial extents greater than the axial extents of said opposing permanent magnets on said seal rings, respectively.

12. A seal according to claim 8 including ninth and tenth permanent magnets carried by said second seal ring on opposite axial sides thereof and eleventh and twelfth permanent magnets carried by said housing on opposite sides of said second seal ring, respectively, said ninth and eleventh magnets being in axial opposition to one another to define an axially extending gap therebetween on one side of said second seal ring, said tenth and twelfth magnets being in axial opposition to one another to define an axially extending gap therebetween on the opposite side of said second seal ring whereby said axial opposite magnets maintain said gaps substantially constant.

13. A seal according to claim 1 wherein said radially spaced pair of permanent magnets carried by said shaft and said seal ring, respectively, extend annularly about said shaft and said housing, said radially spaced pair of permanent magnets having axial widths different from one another enabling relative axial displacement of said shaft and said seal ring without substantially affecting the magnitude of the forces generated by said radially spaced pair of permanent magnets maintaining said gap between said seal ring and said shaft substantially constant.

14. A seal for minimizing leakage between fixed and rotatable elements comprising:
  a shaft mounted for rotation about an axis;
  a housing disposed about and spaced from said shaft;
  a seal ring in said housing about said shaft, said seal ring being spaced from said shaft and defining a circumferentially extending radial gap therebetween;
  a pair of annular permanent magnets carried by said shaft and said seal ring at like axial positions and in radially spaced opposition to one another;
  a second pair of permanent magnets carried by said seal ring and said housing, respectively, in axial opposition to one another on one side of said seal ring to define an axially extending gap between said seal ring and said housing;
  a third pair of permanent magnets carried by said seal ring and said housing, respectively, in axial opposition to one another on the opposite side of said seal ring to define a second axially extending gap between said seal ring and said housing, said pairs of permanent magnets generating repelling forces therebetween to enable said seal ring to maintain substantially constant gaps between it and said shaft and said housing to minimize leakage through the seal.

* * * * *